Patented Aug. 25, 1953

2,649,702

UNITED STATES PATENT OFFICE 2,649,702

SNAP FREEZING BY COOLING A MASS WHILE UNDER PRESSURE AND QUICKLY RELIEVING THE PRESSURE

Edward P. Kellie, Detroit, Mich.

No Drawing. Application September 1, 1950, Serial No. 182,887

7 Claims. (Cl. 62—173)

This invention relates to a method of fast freezing.

It is an object of this invention to produce a method of freezing materials, such as foods, liquids and emulsions, which is instantaneous and efficient and which preserves the original physical condition of the material being frozen.

In freezing any substance, it is the liquid in the substance which freezes and changes to a solid state. This invention contemplates a method of freezing in which heat can be abstracted from the substance being frozen more efficiently and at a faster rate than with presently known methods.

With the prior method of freezing of foods the exterior of the substance being frozen freezes first and there is then a progressive freezing of the interior, and such prior method of freezing is much slower due to the fact that the ice formed in, and on, the exterior of the substance being frozen acts as an insulator, reducing the rate of heat transfer from the interior of the substance being frozen, and said reduction is greater as the thickness of the frozen part increases.

This invention contemplates a method of freezing wherein the entire substance freezes uniformly and instantaneously throughout so that there is no progressive freezing from the exterior to the interior. This object is achieved by applying fluid pressure to a chamber containing the substance to be frozen to thereby reduce the freezing temperature of the substance to be frozen to a temperature below its normal freezing temperature at atmospheric pressure, then reducing the temperature of the substance below its normal freezing temperature but above the temperature at which it will freeze in the pressurized chamber and then reduce, either partially or completely, the pressure in the pressurized chamber to thereby raise the freezing temperature at which the substance will freeze and cause instantaneous freezing of the substance throughout its entire mass.

The method which constitutes this invention is as follows: The substance, such as food, liquid or emulsion, to be frozen is placed in a closed chamber, the pressure in the chamber is then raised to a pressure higher than atmospheric by forcing a gas, such as air, into the chamber. Ordinarily in freezing a substance, the gas used for pressurizing the substance should be inert to that substance. Carbon dioxide and air are examples of suitable gases that can be used in practicing the instant method. However, there may be instances where it is desired to effect a chemical reaction between the substance being frozen and the gas used for placing the substance under pressure. The instant method contemplates the use of any gas suitable under the circumstances for bringing the substance under the desired pressure preparatory to freezing the same.

The gaseous pressure within the chamber containing the food to be frozen can be raised to any pressure desired higher than atmospheric but preferably, by way of example, should be raised to pressures of the order of 250 pounds gauge and higher. There is no critical upper limit to the gaseous pressure to which the substance to be frozen can be subjected except that it is not desirable to raise the pressure to a point at which the substance will be crushed or otherwise injured. The important thing is that the pressure should preferably be raised to a point where the freezing temperature of the substance to be frozen is depressed or lowered to a temperature below the normal freezing temperature of the substance, that is, the temperature at which the substance will freeze at atmospheric pressure, because this permits the extraction of heat from the substance without causing the same to freeze until the pressure is released or lowered to atmospheric pressure.

By subjecting or applying such gaseous pressure to the substance to be frozen, the temperature of the entire substance to be frozen can be reduced to a temperature below its normal freezing temperature at atmospheric pressure before any freezing of the substance takes place. The pressurized chamber and the substance to be frozen therein are now reduced to a temperature below the temperature at which the substance will freeze at atmospheric pressure but above the temperature at which the substance will freeze at the pressure to which it is subjected in the chamber.

This refrigerating or cooling of the substance to such lower temperature can be effected by any known method or means of refrigeration and can be conveniently accomplished by mechanical refrigeration by making the pressurized compartment or chamber the freezing compartment of a mechanical refrigeration system or by simply positioning the pressurized chamber into a compartment or a refrigerated atmosphere having the desired low temperature. As soon as the mass within the pressurized chamber reaches the said desired temperature below its normal freezing temperature at atmospheric pressure but above the freezing point of the substance at the higher pressure to which it is subjected, the pressure in the compartment is reduced to a pressure at which the substance will freeze instantaneously at the temperature to which it has been reduced. This last step can conveniently be accomplished by releasing the pressure gas from the chamber and restoring the pressure in the chamber to atmospheric pressure.

In practicing the method, which is the subject of the present invention, two tests which are exemplary of the tests which have been run according to the instant method, are as follows: Two identical pieces of beef were placed one in sealed chamber A and the other piece of beef was placed in sealed chamber B. Each chamber was provided with a sealed door through which access could be had to the interior of the chamber. A thermocouple was introduced into the center of each piece of beef. The pressure in chamber A was atmospheric and the pressure in chamber B was raised to 300 pounds gauge by pumping air into chamber B. Both sealed chambers containing the identical pieces of beef were placed in a refrigerated compartment or freezer having an air temperature of about 20° below 0° F. It was found that when the temperature reading at the center of the beef in chamber B reaches 32° F. the reading for the center of the beef in chamber A was considerably higher although at this point it was noted that the exterior of the beef in chamber A started to freeze while the exterior of the beef in chamber B showed no signs of freezing. When the temperature at the center of the beef in chamber B was below the freezing temperature of the beef at atmospheric pressure but above the freezing temperature of the beef at 300 pounds gauge, the exterior of the beef in chamber B still showed no signs of freezing and at this point the pressure gas was released from chamber B, reducing the pressure in chamber B to atmospheric pressure. The beef in chamber B immediately froze and was removed and found to have frozen instantaneously all the way through. The refrigeration of chamber A continued until the center temperature of the beef therein was below the freezing point of the beef at atmospheric pressure. It took an appreciably longer time to reach this point than it did for the beef in chamber B. All visual observations were made by looking through "plexiglas" windows provided in each chamber.

Examination of cross section of the two samples of beef while in their thus frozen state indicated that ice formed in discernible crystals in the sample in chamber A but such crystals were not discernible in the sample frozen in chamber B. This indicates that the moisture or water content of the cells of the beef in chamber B had frozen in place instantly and had not been squeezed out of the cells to form larger ice crystals as was the case with the beef in chamber A.

With the instant method of freezing under pressure, the entire mass can be maintained unfrozen until a point below normal freezing temperature (that is, the temperature at which a substance will freeze at atmospheric pressure) is reached and sufficient heat can be removed from the substance to be frozen (while the mass or substance is still unfrozen) such that upon release of the gasous pressure to reduce the pressure in the pressurized freezing chamber to atmospheric pressure, the refrigerated mass will freeze throughout instantly.

By following the method, which is the subject of this invention, the rate of heat transfer throughout the unfrozen mass is very considerably higher than when the exterior of the substance to be frozen is frozen first and freezing is permitted to occur progressively. Because of this, it is possible to effect satisfactory freezing at higher temperatures than are at present used in so-called "fast" or "sharp" freezing, without the formation of large ice crystals and without apparent cell damage. "Fast" or "sharp" freezing is usually accomplished at temperatures of the order of 40° to 70° below 0° F. Freezing by the instant method at higher temperatures would increase the capacity of a given refrigerator unit as against the same unit operating at the temperatures now used (40° to 70° below 0° F.) for "fast" or "sharp" freezing because higher freezing temperatures permit higher suction gas pressures and hence greater capacity on the refrigeration unit. If the instant method of instantaneously freezing were practiced at temperatures as low as those used in conventional "sharp" or "fast" freezing, the increased rate of heat transfer possible by the instant method would materially reduce the time required for freezing.

The instant method of freezing under pressure may be used for many purposes other than food (liquid or solid), for example, tests have shown that with a sample of emulsion placed in chamber A and an identical sample of emulsion in chamber B, the emulsions being frozen according to the above outlined method, the sample in chamber A frozen at atmospheric pressure contained large ice crystals and the emulsion separated even though agitated during the freezing operation. The emulsion sample in chamber B remained liquid until the pressure was released and then froze instantaneously throughout without separation and became a solid frozen mass without visible ice crystals.

Another example of the use of the instant method of freezing under pressure consists of freezing a liquid which has absorbed a gas and retaining the gas within the frozen liquid. A sample of water was placed in chamber B under carbon dioxide gas pressure at about 300 pounds gauge and the water was reduced in temperature to below 32° F. and remained liquid. During the time that was required to reduce the temperature of the water to below 32° F., the water absorbed carbon dioxide. When the temperature of the water had been reduced to below 32° F., it was still liquid with no sign of ice formation at the high pressure maintained in chamber B. The pressure was then released and bubbles of carbon dioxide appeared in the water but at the same instant the water froze solid throughout and the bubbles of carbon dioxide were frozen individually in place and could be seen in the block of ice. Later this block of ice was placed in a container of water at a temperature of about 78° F. The ice melted, released the carbon dioxide as it melted and carbonated the water into which the ice had been placed.

From the above it is evident that the instant method of freezing under pressure has many uses and varies considerably from the normal freezing of similar substances at atmospheric pressure.

I claim:

1. The method of freezing a generally solid substance containing an aqueous medium in a highly dispersed state comprising subjecting the substance to a gaseous pressure higher than atmospheric, refrigerating the substance to reduce the temperature of the thus pressurized substance to a temperature lower than the freezing temperature of the aqueous medium at atmospheric pressure and above the freezing temperature of the aqueous medium while under such high pressure, and then reducing the gaseous pressure to raise the freezing point of the aqueous medium to at least its then temperature whereby the substance freezes instantaneously throughout the mass.

2. The method defined in claim 1 wherein the substance is pressurized at a gaseous pressure of the order of at least 300 pounds gauge.

3. The method defined in claim 1 wherein the pressurizing gas is inert in relation to the substance being frozen.

4. The method of freezing food products containing moisture comprising subjecting the food product to a gaseous pressure higher than atmospheric, refrigerating the food product to reduce its temperature while under such gaseous pressure to a temperature lower than the freezing temperature of the moisture at atmospheric pressure and above the freezing temperature of the moisture corresponding to such higher pressure and then quickly reducing the gaseous pressure to raise the freezing point of the moisture to at least the temperature to which the food product has been reduced whereby the food product freezes instantaneously throughout its mass.

5. The method of freezing a generally solid food product containing moisture comprising subjecting the food product to a gaseous pressure higher than atmospheric, refrigerating the food product to reduce its temperature under such gaseous pressure to a temperature lower than the freezing temperature of the moisture at atmospheric pressure and above the freezing temperature of the moisture corresponding to such higher pressure, controlling the rate of heat extraction from said food product during said step of refrigerating to prevent freezing of the outer portions of said food product, and then reducing the gaseous pressure to raise the freezing point of the moisture to at least the temperature to which the food product has been reduced whereby the food product freezes instantaneously throughout its mass.

6. The method of freezing fresh meat comprising subjecting the meat to a gaseous pressure higher than atmospheric, refrigerating the meat to reduce its temperature under such gaseous pressure to a temperature lower than the freezing temperature of the moisture dispersed throughout the meat at atmospheric pressure and above the freezing temperature of the moisture corresponding to such higher pressure, controlling the extraction of heat from the meat during such refrigeration to prevent freezing of the outer surface portions of the meat, and thereafter reducing the gaseous pressure to raise the freezing point of the moisture in the meat to at least the temperature to which the meat has been reduced whereby said moisture freezes and the meat becomes frozen instantaneously throughout its mass.

7. The method of freezing a generally solid food product containing moisture comprising subjecting the food product to a gaseous pressure of at least three hundred pounds per square inch, refrigerating the food product to reduce its temperature to not more than 28° F. above 0° F., controlling the extraction of heat from said food product during such refrigeration to prevent freezing of the outer surface portions of the food product, and then reducing the gaseous pressure to atmospheric to raise the freezing point of the moisture in said food product to a temperature above 28° F. above 0° F. whereby the food product freezes instantaneously throughout its mass.

EDWARD P. KELLIE.

References Cited in the file of this patent

UNITED STATES PATENTS

| Number | Name | Date |
|---|---|---|
| 1,370,221 | Ophuls | Mar. 1, 1921 |
| 1,743,375 | Mundorff, Jr. | Jan. 14, 1930 |
| 1,828,853 | Vogt | Oct. 27, 1931 |
| 1,981,675 | Stapp | Nov. 20, 1934 |
| 2,196,080 | Reynoldson | Apr. 2, 1940 |
| 2,197,457 | Werk et al. | Apr. 16, 1940 |
| 2,297,786 | Lindbolm | Oct. 6, 1942 |
| 2,411,152 | Folsom | Nov. 19, 1946 |

OTHER REFERENCES

Handbook of Chemistry and Physics, fifteenth edition, by Hodgman and Lange, published by Chemical Rubber Publishing Company, p. 892.